United States Patent
Pedre

(10) Patent No.: US 8,311,798 B2
(45) Date of Patent: Nov. 13, 2012

(54) TRANSLATION METHOD AND A DEVICE, AND A HEADSET FORMING PART OF SAID DEVICE

(76) Inventor: Joel Pedre, Saint Joseph (FR)

( * ) Notice: Subject to any disclaimer, the term of this patent is extended or adjusted under 35 U.S.C. 154(b) by 230 days.

(21) Appl. No.: 12/680,219

(22) PCT Filed: Sep. 26, 2008

(86) PCT No.: PCT/FR2008/001359
§ 371 (c)(1),
(2), (4) Date: Mar. 26, 2010

(87) PCT Pub. No.: WO2009/080908
PCT Pub. Date: Jul. 2, 2009

(65) Prior Publication Data
US 2011/0238405 A1 Sep. 29, 2011

(30) Foreign Application Priority Data
Sep. 28, 2007 (FR) .................. 07 06828

(51) Int. Cl.
*G06F 17/28* (2006.01)
(52) U.S. Cl. .................. 704/3; 704/2; 704/4
(58) Field of Classification Search .......... None
See application file for complete search history.

(56) References Cited

U.S. PATENT DOCUMENTS

| | | | | |
|---|---|---|---|---|
| 4,987,592 A * | 1/1991 | Flagg | | 379/430 |
| 5,983,100 A * | 11/1999 | Johansson et al. | | 455/426.1 |
| 6,157,727 A | 12/2000 | Rueda | | |
| 6,434,518 B1 * | 8/2002 | Glenn | | 704/3 |
| 7,707,035 B2 * | 4/2010 | McCune | | 704/270 |
| 2002/0123879 A1 * | 9/2002 | Spector | | 704/2 |
| 2003/0065504 A1 * | 4/2003 | Kraemer et al. | | 704/8 |
| 2003/0115059 A1 | 6/2003 | Jayaratne | | |
| 2004/0022395 A1 * | 2/2004 | Turnbull | | 381/74 |
| 2004/0186727 A1 * | 9/2004 | Andrade | | 704/275 |
| 2006/0153394 A1 * | 7/2006 | Beasley | | 381/57 |
| 2006/0282269 A1 | 12/2006 | Galison | | |
| 2008/0004872 A1 * | 1/2008 | Nordholm et al. | | 704/226 |
| 2008/0077387 A1 | 3/2008 | Ariu | | |
| 2008/0091407 A1 | 4/2008 | Furihata et al. | | |

FOREIGN PATENT DOCUMENTS

WO 03/052624 6/2003

OTHER PUBLICATIONS

International Search Report dated Apr. 27, 2009, from corresponding PCT application.

* cited by examiner

*Primary Examiner* — Jesse Pullias
(74) *Attorney, Agent, or Firm* — Brooks Kushman P.C.

(57) ABSTRACT

A translation method and device (1) enabling a first individual speaking in a first language to converse with a second individual speaking in a second language different from the first language, the device includes translation element (30) translating the first words of the first individual into the second language and the second words of the second individual into the first language. The device is provided with a headset (12) connected to the translation element (30) by connection element (20), the headset (12) being provided with at least one earpiece (11, 11'), a microphone (14), and a loudspeaker (15), the microphone (14) picking up first and second words from the first and second individuals in order to enable the first and second words to be translated by the translation element (30) and then, once translated, to be delivered respectively to the earpiece (11, 11') or to the loudspeaker (15).

13 Claims, 1 Drawing Sheet

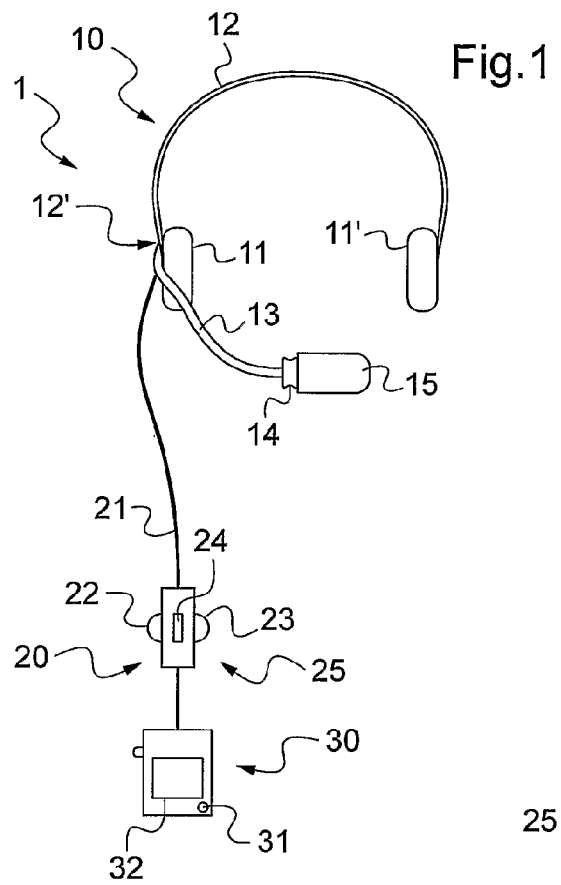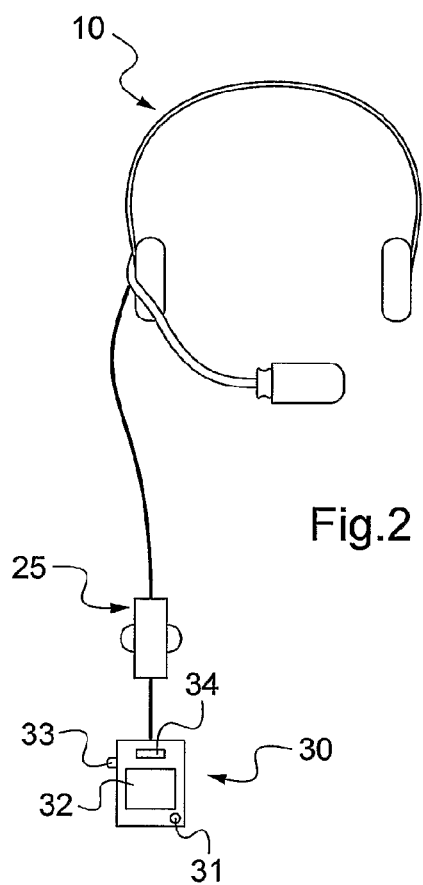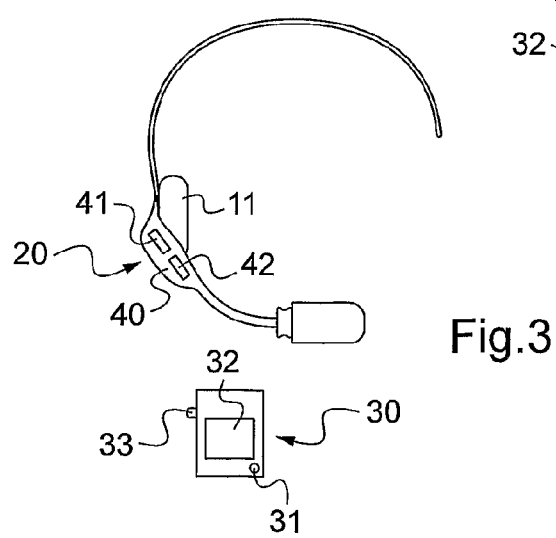

TRANSLATION METHOD AND A DEVICE, AND A HEADSET FORMING PART OF SAID DEVICE

FIELD OF THE INVENTION

The present invention relates to a translation method and device, and also to a headset forming part of the device.

BACKGROUND OF THE INVENTION

Humans communicate with one another by voice using a plurality of languages. Most countries have at least one official language specific thereto that differs from the languages used in other countries.

In some countries, it is also found that humans do not communicate with one another by using the official language of their country, but rather by using a local language, e.g. known as a "patois".

Since transport means have been developed to a large extent, it is easy to travel from one country to another. It is also observed that international trade occupies a major fraction of global economic activity.

Consequently, whether in the context of tourism or of professional activity, a first individual is very likely to need to communicate with a second individual in a language other than the first individual's mother tongue.

It is thus commonplace to learn one or more foreign languages while at school. Unfortunately, it is not possible in practice to master and speak all existing languages.

Consequently, a first device is known that enables text written in a first language to be translated into a second language.

An individual then keys in the text for translation via a keyboard to enable the software to translate it into the second language. Once translated, the software displays the translation on a screen.

That first device is undeniably very practical but it remains limited for oral conversation. It is not sufficient to be able to read the translation in question, it is also necessary to be able to utter it correctly so that it can be understood by the other party. If the user does not pronounce the displayed phrase correctly, there is a risk of not being understood.

A second device is known that constitutes an improvement over that first device. The second device does not display the translation on a screen, but generates a voice signal representative of said translation.

The voice signal is a perfect imitation of a human voice so the second device satisfies requirements.

Nevertheless, it remains time-consuming and not very practical to key-in the text for translation by means of a keyboard.

Document US 2006/0282269 discloses a third device comprising a rectangular box containing a microprocessor.

The box is also provided with a loudspeaker and a microphone and an electronic chip containing the vocabularies of first and second languages.

By pressing on a button, an individual enables the third device to record first words uttered by a first individual in the first language.

Then by pressing on another button, the individual requests the third device to translate the recorded first words. The microprocessor then makes use of the electronic chips to perform the translation, and causes the loudspeaker to play back said translation of the first words in audible manner.

That third device thus constitutes a significant technological advance over the first and second devices.

Nevertheless, it can be seen that it is necessary to hold the housing in the hand in order to use it and that the translated first words end up being delivered from the hands of the first individual making use of the third device. It can thus readily be understood that the resulting conversation is not natural, the speakers present ending up talking to the third device and not to each other.

Finally, that third device appears to translate only speech uttered in a first language into a second language. Thus, when first and second individuals are conversing with each other, only the words of one of the individuals are translated. Consequently, it is necessary for each individual to make use of a respective device, which does not appear to be very realistic, since individuals living in their home countries do not walk about with translation devices.

OBJECT AND SUMMARY OF THE INVENTION

An object of the present invention is to provide a headset suitable for use with the device of the invention in application of a determined method, making it possible to overcome the limitations of the above-mentioned translation devices and enabling natural conversation to take place between two individuals who do not speak a common language.

Document D1=US 2003/115059 (Jayaratne) corresponds to WO 03/052624. That document describes a system for real time translation between a plurality of spoken languages. The system conventionally comprises a microphone, a voice-to-text converter, a spoken language converter, first and second language translation units, and a text-to-voice converter. In its FIG. 3 or 5, that document provides for the system to be interposed at least in part at a distance between two people seeking to communicate verbally in two different languages. Such a remote system is not portable. One embodiment provides for a headset provided with two loudspeakers.

Document U.S. Pat. No. 6,157,727 describes an instantaneous translation system that appears to have only one microphone and only one loudspeaker.

Document US 2006/282269 describes a translation unit suitable for being held in the hand and suitable for translating a picked-up voice communication from a first language into a second language. That unit has a single microphone and a single loudspeaker.

Document US 2004/186727 describes an asymmetrical headset for wearing on one ear to play back prerecorded information in response to a voice command, having a single mouth-position microphone and a single loudspeaker.

The invention is defined by the claims.

According to the invention, a headset that enables a first individual speaking in a first language to converse with a second individual speaking in a second language that is different from the first language, is provided with a rigid headband having an earpiece fitted to at least one of its ends. The headset is remarkable in that it includes a microphone and a loudspeaker, the microphone serving to pick up the first and second words of said first and second individuals so that the first and second words are translated and, once translated, are then delivered respectively to the earpiece and to the loudspeaker.

Consequently, when the first individual speaks, the first words are picked up by the microphone, translated, and then played back, once translated, by the loudspeaker. The second individual can then understand the speech of the first individual.

Likewise, when the second individual speaks, the second words are picked up by the microphone, translated, and then played back, once translated, by the earpiece arranged against the ear of the first individual. The first individual can thus understand the speech of the second individual.

Furthermore, the headset is fitted so that translation takes place bilaterally, the speech both of the first individual and of the second individual being translated. The headset does not only play back the second translated words from a second individual via one or more earpieces, but it also plays back the first translated words from a first individual via a loudspeaker, which is most surprising insofar as a headset is normally a personal piece of equipment that is suitable only for performing the first above-mentioned function.

Furthermore, since the headset is located solely on the head of the first individual, the first translated speech from the first individual appears to come from that individual's mouth, thereby making conversation natural.

To accentuate this undeniable and inventive advantage over previously-existing devices, the microphone is secured to a flexible boom that is arranged at the end of the headband so that the first individual can place the microphone in register with the mouth, and the loudspeaker is arranged on said flexible boom close to the microphone, and preferably against the microphone.

Consequently, first translated words from the first individual actually appear to come from that individual's mouth and not from an appliance held in the hand or a pocket, for example.

Furthermore, the headset is provided with an adjustment member having first and second adjustment means, such as thumbwheels, for adjusting the sound volumes respectively of the earpiece and of the loudspeaker.

When the headset is connected to translation means via connection means, i.e. a conventional wireless or wired connection, the first and second adjustment means are advantageously arranged on the connection means.

The present invention also provides a complete translation device that includes the headset of the invention.

This translation device, enabling a first individual speaking in a first language to converse with at least one second individual speaking in a second language that is different from the first language includes translation means for translating the first words of the first individual into the second language, and the second words of the second individual into the first language. The translation means can then make use of the speech recognition and translation technology used in models that exist in the prior art.

Nevertheless, the device is remarkable in that it is provided with a headset of the invention that is connected to the translation means via connection means, i.e. a wireless or a wired connection, the headset being provided with an earpiece, a microphone, and a loudspeaker. The microphone then picks up the first words of the first individual and the second words of the second individual in order to enable these first and second words to be translated by the translation means and then delivered, once translated, respectively to the earpiece and to the loudspeaker. The method implemented by the device is explained below.

In a first embodiment, the headset includes selector means that are activatable by the first individual, the selector means informing the translation means whether they are to translate the words, i.e. either the first words or the second words, as sent by the microphone into the first language and deliver them to the earpiece, or whether they are to translate the words sent by the microphone into the second language and deliver them to the loudspeaker.

The selector means may then be arranged on the connection means of the headset.

In a second embodiment, the translation means include selector means that are activatable by the first individual, the selector means informing the translation means whether they are to translate the words, i.e. either the first words or the second words, as sent by the microphone into the first language and deliver them to the earpiece, or whether they are to translate the words sent by the microphone into the second language and deliver them to the loudspeaker.

In a third embodiment, the translation means include identifier means enabling the device to determine whether the words exchanged, i.e. either the first words or the second words, as sent by said microphone are expressed in the first language or in the second language, the translation means translating the words into the second language before delivering them to the earpiece of the headset if the words are expressed in the first language, and translating the words into the first language prior to delivering them to the loudspeaker of the headset if the words are expressed in the second language.

To summarize, the device may include means for determining whether the translation means are to translate the first words from the first individual or the second words from the second individual. In the first and second embodiments, these means are selector means suitable for being activated by the first individual and they are arranged respectively on the headset or on the translation means, whereas in the third embodiment, they comprise identifier means forming part of the translation means.

In the third embodiment, the translation means can determine whether the words picked up by the microphone are uttered in the first language or in the second language with the help of identifier means.

Furthermore, the translation means include a primary memory suitable for containing the vocabulary used by a plurality of distinct languages, the translation means being provided with elector means for defining the natures of the first and second languages. Thus, the translation means possess in their primary memory a plurality of preprogrammed languages, and the user can choose which languages to use with the help of the elector means.

Furthermore, the translation means include a primary memory suitable for containing the vocabulary used by a plurality of distinct languages, the translation means being provided with downloading means to record a new language in the primary memory.

If the first individual does not possess the required language in the device, it is possible to use the downloading means to record the new language in the device.

The downloading means may comprise conventional means for connection to computer networks in order to access an exhaustive database containing all or nearly all of the languages spoken in the world.

In addition, the translation means include a display screen, the first and second words translated by the translation means being firstly delivered once translated respectively to the earpiece and to the loudspeaker, and secondly written on the display screen.

Thus, a failure of the earpieces or of the loudspeaker does not necessarily put an end to conversation.

Finally, it is advantageous for the translation means to include a secondary memory suitable for recording first and second words, regardless of whether first and second words are original or translated.

The translation means then perform an additional function that is very useful, e.g. when a first individual asks a second individual to point out the route to be followed to reach a determined location. The first individual then does not need to remember the explanations given by the second individual, since the explanations concerned can be accessed again by consulting the secondary memory of the translation means.

Finally, the invention provides a method that makes use of the above-described inventive device for enabling a first individual speaking a first language to converse with a second individual speaking a second language that is different from the first language, during which method, the following steps are performed in succession during an emission stage:

a1) a microphone picks up the first original words uttered by the first individual in the first language and delivers a first non-translated signal relating to the first original words to translation means;

a2) the translation means convert the first non-translated signal into a first translated signal corresponding to first translated words, these first translated words being the translation into the second language of the first original words; and a3) the translation means deliver the first translated signal to the loudspeaker that converts it into audible first translated words.

In addition, the following steps are performed in succession during a reception stage:

b1) a microphone picks up second original words uttered by the second individual in the second language and sends a second non-translated signal relating to the second original words to translation means;

b2) the translation means convert the second non-translated signal into a second translated signal corresponding to second translated words, the second translated words being a translation into the first language of the second original words; and b3) the translation means deliver the second translated signal at least to an earpiece that converts it into audible second translated words.

Advantageously, the device includes selector means, and during a preliminary step, the first individual actuates the selector means to inform the translation means whether they are to act in the reception stage or in the emission stage, i.e. to determine whether the first signal they receive is a first non-translated signal or a second non-translated signal, in order to determine whether they are to implement steps a2) and a3) or steps b2) and b3). In a first embodiment, the selector means are arranged on the headset connection means, while in a second embodiment the selector means are arranged on the translation means.

In a third embodiment, the translation means include identifier means enabling them to determine whether the words sent by the microphone are uttered in the first language or in the second language, the translation means using their identifier means to know whether they are to act in a reception stage or in an emission stage, i.e. to determine whether the first signal they receive is a first non-translated signal or a second non-translated signal, in order to determine whether they are to implement steps a2) and a3) or steps b2) and b3).

BRIEF DESCRIPTION OF THE DRAWING

The invention and its advantages appear in greater detail from the following description of embodiments given by way of illustration with reference to the accompanying figures, in which:

FIG. 1 is a diagrammatic view of the translation device in a first embodiment;

FIG. 2 is a diagrammatic view of the translation device in a second embodiment; and FIG. 3 is a diagrammatic view of the translation device in a third embodiment.

MORE DETAILED DESCRIPTION

Elements that are present in two or more distinct figures are given the same reference in each of them.

FIG. 1 is a diagrammatic view of a translation device 1 in a first embodiment, the translation device 1 enabling a first individual speaking a first language to converse with a second individual speaking a second language different from the first language.

The translation device 1, arranged on the first individual, has a headset 10 and translation means 30 connected together by connection means 20.

The headset 10 includes a headband 12 that matches the shape of the skull of the first individual, one end 12' of the headband being provided with an earpiece 11.

It should be observed that the other end of the headband is also provided with an earphone 11', even though configuration is optional, as shown by way of example in FIG. 3.

Furthermore, the headset 10 is provided with a flexible boom 13 hinged to the end 12' of the headset that is provided with the earpiece 11. A microphone 14 and a loudspeaker 15 are secured to the flexible boom 13.

Consequently, the flexibility of the flexible boom 13 enables the first individual to place the microphone 14 and the loudspeaker 15 facing the mouth.

In addition, the headset 12 is provided with connection means 20, specifically wire connection means 21 in the variant shown in FIGS. 1 and 2.

The wire connection means 21 advantageously have an adjustment member 25 provided with first and second adjustment means 22, 23, such as adjustment thumbwheels, for example.

These first and second adjustment means 22, 23 serve to adjust the volume of the sound delivered respectively by the earpieces 11, 11', and by the loudspeaker 15.

The headset 12 is thus connected to translation means 30 via connection means 20, which translation means may be located in a pocket of the first individual.

The translation means 30 are electrically powered by a battery (not shown) and are suitable firstly for translating into a second language the first words uttered in a first language by the first individual, and secondly for translating into the first language the second words uttered in the second language by a second individual who does not have an automatic translator.

In accordance with the method implemented by the translation device 1, it is possible to distinguish between two distinct stages, namely an emission stage during which the first individual speaks using a first language, and a reception stage during which the second individual speaks using a second language.

For the emission stage, during a step a1), the microphone 14 of the headset 10 picks up the first original words uttered by the first individual in said first language.

In conventional manner, the microphone transforms these first original words into a first non-translated signal, and sends this first non-translated signal to the translation means via the connection means 20.

In a step a2), the translation means 30 translate the first original words. More precisely, using known means and algorithms, they transform the first non-translated signal into a first translated signal, the first translated signal corresponding to first translated words and thus to the translation of the first original words into the second language.

Finally, during a step a3), the translation means 30 send the first translated signal to the loudspeaker 15 via the connection means 20. The loudspeaker 15 acts in turn to transform the first translated signal into first translated words that can be heard by the second individual in particular, and also by the first individual.

The second individual thus hears speech that he/she can understand since it is expressed in the language of the second individual, i.e. the second language. This speech also appears to have been uttered by the first individual insofar as it comes from a loudspeaker 15 situated close to the first individual's mouth.

Even if the assembly comprising the loudspeaker 15 and the microphone 14 might possibly be found unattractive in appearance, it nevertheless remains discreet, thus making conversation very natural.

For the reception stage, during a step b1), the microphone 14 of the headset 10 picks up the second original words uttered by the second individual in said second language.

In conventional manner, the microphone 14 transforms these second original words into a second non-translated signal and sends this second non-translated signal to the translation means 30 via the connection means 20.

During a step b2) the translation means 30 translate the second original words. More precisely, using known means and algorithms, they transform the second non-translated signal into a second translated signal, this second translated signal corresponding to second translated words and thus to the translation of the second original words into the first language.

Finally, during a step b3), the translation means 30 send the second translated signal to the earpieces 11, 11' via the connection means 20. The earpieces 11, 11' act in turn to transform the second translated signal into second translated words that can be heard by the first individual.

Consequently, the microphone 14 enables first and second original words uttered by the first and second individuals to be picked up so that these first and second original words are translated by the translation means 30 and then, once translated, delivered respectively to the earpieces 11, 11' and to the loudspeaker 15.

The translation device 1 and the implemented method are already highly effective. Nevertheless, it is possible to facilitate the work of the translation means by giving them means for knowing whether they are confronted with an emission stage or a reception stage.

In the first embodiment shown in FIG. 1, the translation device 1, and more particularly the headset 10, is provided with selector means 24. By switching the selector means, such as a first switch placed on the adjustment means 25 of the headset 10, the first individual informs the translation means whether they are to implement a reception stage or an emission stage.

For example, the first individual places the first switch in a first position before speaking, to inform the translation means that they are to apply steps a2) and a3) in order to translate these first original words into first translated words.

In contrast, when the second individual is speaking, the first individual places the first switch in a second position before speaking, in order to inform the translation means that they need to implement steps b2) and b3) of the method in order to translate these second original words into second translated words.

With reference to FIG. 2, in a second embodiment, the translation device is still provided with selector means, however the selector means 34 are arranged on the translation means 30 and not on the adjustment means 25 of the headset 10.

Finally, in a third embodiment as shown in FIG. 3, the translation device does not have selector means.

However, the translation means 30 are fitted with identifier means, e.g. a suitably programmed microprocessor, suitable for determining the language in which the original words were uttered that have given rise to the signal being received. The identifier means determine whether this speech picked up by the microphone was uttered in the first language or in the second language. When the identifier means have performed their function, the translation means then know whether they are to implement steps a2) and a3) of the method, or steps b2) and b3).

Whatever the embodiment selected, the translation means 30 include a primary memory (not shown in the figures) in which there is stored all of the data relating to a plurality of languages and enabling the translation means to perform the desired translations. At the very least, it necessarily contains the vocabulary for first and second languages.

Nevertheless, it is possible for the primary memory to possess large storage capacity and to be capable of containing data relating to at least three distinct languages. The first individual using the device then has elector means for determining which languages are selected as the first and second languages.

The elector means may comprise a display screen 32 on which a list of available languages is displayed and a thumbwheel 34 enabling the first individual to select the languages elected as first and second languages.

It should be observed that advantageously the first and second words translated by the translation means are firstly delivered, once translated, respectively to the earpieces 11, 11' or to the loudspeaker 15, and secondly, they are optionally written on the display screen.

Thus, a failure of the earpieces or of the loudspeaker does not necessarily put an end to conversation.

In addition, it is advantageous for the translation means to be provided with downloading means 30, such as a dedicated connector, in order to update said primary memory and the list of available languages.

The first individual can use the downloading means to access a computer network for downloading all of the data relating to a new language into the translation means.

With reference to FIG. 3, the connection means 40 of the headset 12 connecting with the translation means 30 comprise wireless connection means 40 having first and second adjustment means 41, 42. It is also possible to envisage incorporating selector means as shown in the first embodiment of the invention in said wireless connection means.

Furthermore, it can be seen that the headband 12 of the headset 10 has only one earpiece 11.

Finally, it is advantageous for the translation means to include a secondary memory (not shown in the figures) that is suitable for recording the first and second words, regardless of whether the first or second words are in original or translated form.

The translation means then perform an additional function of the tape recorder type, for example. This additional function may be controlled by the first individual actuating conventional means, such as a pushbutton.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

For example, it is possible to use the device of the invention as means for learning a language.

To this end, the translation means include an actuator capable of selecting a "translation" mode of operation as described above, or a "teaching" mode of operation.

In this particular "teaching" mode of operation, the microphone 14 picks up the first words from the first individual. These first words are then translated by the translation means that, once they have been translated, deliver them to the earpieces and not to the loudspeaker.

A first individual seeking to obtain the translation of a word or a phrase in order to enrich his or her own knowledge, can then make use of the "teaching" mode of operation.

It is also possible to combine both modes of operation. The first translated modes are then both sent to the earpieces and to the loudspeaker. The first individual can then reduce the volume level of the loudspeaker in order to simulate the above-described "teaching" mode of operation.

Finally, the translation means envisaged in the device may naturally be the translation means described with reference to the figures.

Nevertheless, it is possible to envisage connecting the headset of the invention to a computer that undertakes the translation.

Another solution consists in connecting the headset to an appliance that enables the headset to be connected to a specialized translation agency, the translation means then comprising remote connection means, such as a mobile telephone, connecting the headset to a physical person acting as a translator.

The invention claimed is:

1. A translation headset for translating between a first conversation language and a second conversation language that is different from said first language, said headset including a rigid headband having at least one end fitted with an earpiece and with a microphone to be placed in register with the mouth, connection means connecting the headset to translation means for translating between the first and second conversation languages, only said microphone being connected in such a manner as to pick up the first and second conversation languages and then transmit them to the translation means via the connection means; each earpiece being connected by said connection means to deliver a translation into the first conversation language as performed by said translation means from the second conversation language; and said headset further including a loudspeaker connected by the connection means to deliver a translation into the second conversation language as performed by said translation means from the first conversation language, so that the first and second languages picked up only by the microphone are delivered, once translated respectively into the second and first languages, respectively by said loudspeaker and by said earpiece with the loudspeaker delivering the translation into the second language from the first language picked up only by the microphone and with the earpiece delivering the translation into the first language from the second language picked up only by the microphone, wherein said microphone is secured to a flexible boom that is arranged on said end so as to be capable of being placed in register with the mouth, said loudspeaker also being arranged on said flexible boom adjacent to said microphone.

2. A headset according to claim 1, that is provided with adjustment means having first and second adjustment means respectively for adjusting a sound volume from said earpiece and from said loudspeaker.

3. A device according to claim 1, wherein said translation means include identifier means enabling said translation means to determine whether words picked up by said microphone are expressed in said first language or in said second language, the translation means translating said words into the second language before delivering them to said earpiece if the words are expressed in the first language, and translating said words into the first language before delivering them to said loudspeaker if the words are expressed in the second language.

4. A translation device for translating between a first conversation language and a second conversation language that is different from said first language, the device comprising a headset, the headset including a rigid headband having at least one end fitted with an earpiece, a microphone secured to a flexible boom so as to be capable of being placed in register with the mouth, and connection means, said device including translation means for translating between the first and second conversation languages, and wherein only said microphone is connected so as to pick up the first and second conversation languages and then to transmit them to the translation means via the connection means; each earpiece being connected by the connection means to deliver a translation into the first conversation language as performed by said translation means from the second conversation language; said headset including, on said flexible boom close adjacent to said microphone, a loudspeaker connected by the connection means to deliver a translation into the second conversation language as performed by said translation means from the first conversation language, so that the first and second languages picked up only by the microphone are delivered, once translated respectively into the first and second languages, respectively by said loudspeaker and by said earpiece with the loudspeaker delivering the translation into the second language from the first language picked up only by the microphone and with the earpiece delivering the translation into the first language from the second language picked up only by the microphone; wherein said headset includes selector means, said selector means informing said translation means whether to translate words picked up only by the microphone into either the first language for delivery to the earpiece or into the second language for delivery to the loudspeaker.

5. A device according to claim 4, wherein said selector means include at least one of first selector means and other selector means that are activatable by a user of the headset.

6. A device according to claim 4, wherein said translation means include identifier means enabling them to determine whether the words sent by said microphone are expressed in said first language or in said second language, the translation means translating said words into the second language before delivering them to said earpiece of the headset if the words are expressed in the first language, and translating said words into the first language prior to delivering them to said loudspeaker of the headset if the words are expressed in the second language.

7. A device according to claim 4, wherein said translation means include a primary memory suitable for containing vocabularies used by a plurality of distinct languages, the translation means being provided with elector means for defining the natures of said first and second languages.

8. A device according to claim 4, wherein said translation means include a primary memory suitable for containing a vocabulary used by a plurality of distinct languages, said translation means being provided with downloading means to record a new language in said primary memory.

9. A device according to claim 4, wherein the translation means include a display screen, first and second words translated by the translation means being firstly delivered, once translated, respectively to the earpiece and to the loudspeaker, and secondly being written on the display screen.

10. A device according to claim 4, wherein the translation means include a secondary memory suitable for recording first and second words, regardless of whether first and second words are original or translated.

11. A translation method in order to enable a first individual speaking in a first language to converse with a second individual speaking in a second language that is different from said first language, wherein the following steps are performed in succession during an emission stage: a1) only a microphone, secured on a flexible boom so as to be capable of being placed in register with the mouth, picks up first original words uttered by the first individual in said first language and delivers a first non-translated signal relating to said first original words to translation means; a2) said translation means convert the first non-translated signal into a first translated signal corresponding to first translated words, these first translated words being the translation into said second language of said first original words picked up only by the microphone; a3) said translation means deliver said first translated signal to a loudspeaker, also arranged on the flexible boom adjacent to the microphone, that converts it into audible first translated words; and wherein the following successive steps are performed during a reception stage; b1) only the microphone picks up second original words uttered by the second individual in said second language and sends a second non-translated signal relating to said second original words to translation means; b2) said translation means convert the second non-translated signal into a second translated signal corresponding to second translated words, the second translated words being a translation into the first language of said second original words picked up only by the microphone; and b3) said translation means deliver said second translated signal at least to an earpiece that converts it into audible second translated words.

12. A method according to claim 11, wherein said translation device includes selector means, said first individual actuates said selector means to inform the translation means whether they are to act in the reception stage or in the emission stage in order to determine whether they are to implement steps a2) and a3) or steps b2) and b3).

13. A method according to claim 11, wherein said translation means include identifier means enabling them to determine whether words sent by said microphone are uttered in said first language or in said second language, the translation means using its identifiable means to determine whether they are to act in a reception stage or in an emission stage in order to determine whether they are to implement steps a2) and a3) or steps b2) and b3).

* * * * *